US 11,804,698 B2

(12) United States Patent
Lee et al.

(10) Patent No.: US 11,804,698 B2
(45) Date of Patent: Oct. 31, 2023

(54) SWITCHBOARD HAVING ROTATING SHUTTER STRUCTURE

(71) Applicant: LS ELECTRIC CO., LTD., Anyang-Si (KR)

(72) Inventors: Han-Joo Lee, Anyang-si (KR); Hong-Ik Yang, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 0 days.

(21) Appl. No.: 17/756,943

(22) PCT Filed: Apr. 1, 2020

(86) PCT No.: PCT/KR2020/004484
§ 371 (c)(1),
(2) Date: Jun. 6, 2022

(87) PCT Pub. No.: WO2021/112339
PCT Pub. Date: Jun. 10, 2021

(65) Prior Publication Data
US 2023/0020170 A1 Jan. 19, 2023

(30) Foreign Application Priority Data
Dec. 4, 2019 (KR) .................. 10-2019-0159543

(51) Int. Cl.
*H02B 11/24* (2006.01)
*H02B 1/14* (2006.01)

(52) U.S. Cl.
CPC ............... *H02B 1/14* (2013.01); *H02B 11/24* (2013.01)

(58) Field of Classification Search
CPC .................................. H02B 1/04; H02B 11/24
See application file for complete search history.

(56) References Cited

U.S. PATENT DOCUMENTS 1,566,935 A * 12/1925 Heath .................... H02B 11/04
218/100
4,183,073 A * 1/1980 Clausing ................ H02B 11/24
361/617

(Continued)

FOREIGN PATENT DOCUMENTS

CN 201188516 Y 1/2009
CN 201260044 Y * 6/2009

(Continued)

OTHER PUBLICATIONS

International Search Report for related International Application No. PCT/KR2020/004484; action dated Jun. 10, 2021; (5 pages).

(Continued)

*Primary Examiner* — Robert J Hoffberg
(74) *Attorney, Agent, or Firm* — K&L Gates LLP

(57) ABSTRACT

A switchboard is provided having a rotating shutter structure that comprises: a switchboard body that is provided with a circuit breaker chamber into which a circuit breaker is inserted, and an open hole formed in the rear surface to expose a conductor part of a bushing assembly to the circuit breaker chamber; a shutter part that is rotatably installed in the switchboard body and opens/closes the open hole by (Continued)

rotating; and an operation unit that is installed in the switchboard body and rotates the shutter part when the circuit breaker is inserted into the circuit breaker chamber.

10 Claims, 14 Drawing Sheets

(56) References Cited

U.S. PATENT DOCUMENTS

| | | | | | |
|---|---|---|---|---|---|
| 4,417,108 | A | * | 11/1983 | Vaill | H02B 11/24 361/617 |
| 4,424,425 | A | * | 1/1984 | Castonguay | H02B 11/24 361/617 |
| 4,447,682 | A | * | 5/1984 | Castonguay | H02B 11/24 361/617 |
| 7,450,364 | B2 | * | 11/2008 | Parker | H02B 11/28 361/220 |
| 8,604,368 | B2 | * | 12/2013 | Kim | H02B 11/24 200/50.22 |
| 9,123,488 | B2 | * | 9/2015 | Seo | H01H 33/666 |
| 9,184,572 | B2 | * | 11/2015 | Gao | H02B 11/24 |
| 9,515,462 | B2 | * | 12/2016 | Capelli | H02B 11/28 |
| 10,027,096 | B2 | | 7/2018 | Jakkireddy et al. | |
| 10,418,793 | B2 | * | 9/2019 | Gasparini | H02B 11/24 |
| 2022/0271519 | A1 | * | 8/2022 | Hanna | H02B 11/24 |

FOREIGN PATENT DOCUMENTS

| | | | |
|---|---|---|---|
| CN | 201303228 Y | * | 9/2009 |
| CN | 202094515 U | * | 12/2011 |
| CN | 202210643 U | * | 5/2012 |
| CN | 203352026 U | * | 12/2013 |
| CN | 109066351 A | * | 12/2018 |
| CN | 109217161 A | * | 1/2019 |
| FR | 3050330 B1 | * | 11/2020 |
| JP | 2589109 Y2 | | 11/1998 |
| KR | 20130011474 A | * | 1/2013 |
| KR | 101305103 B1 | | 9/2013 |
| KR | 20180069580 A | | 6/2018 |
| SU | 858157 A1 | * | 8/1981 |
| WO | WO-2020082239 A1 | * | 4/2020 |

OTHER PUBLICATIONS

Written Opinion for related International Application No. PCT/KR2020/004484; action dated Jun. 10, 2021; (5 pages).

* cited by examiner

SWITCHBOARD HAVING ROTATING SHUTTER STRUCTURE

CROSS-REFERENCE TO RELATED APPLICATIONS

This application is the National Stage filing under 35 U.S.C. 371 of International Application No. PCT/KR2020/004484, filed on Apr. 1, 2020, which claims the benefit of earlier filing date and right of priority to Korean Application No. 10-2019-0159543, filed on Dec. 4, 2019, the contents of which are all hereby incorporated by reference herein in their entirety.

FIELD

The present disclosure relates to a switchboard having a pivotable shutter structure, and more particularly, to a switchboard having a pivotable shutter structure capable of achieving miniaturization while maintaining a set insulating distance.

BACKGROUND

In general, a switchboard is installed for various purposes such as operation or control of electric power in industrial sites such as power plants and substations, and operation of electric motors.

A circuit breaker and various electrical devices are installed in a housing of the switchboard. In general, the circuit breaker is housed inside a circuit breaker chamber of the switchboard.

In this regard, a structure to prevent contact of a conductive portion is required for safety of users when there is no circuit breaker in the circuit breaker chamber.

FIG. 1 is a perspective view showing a structure of a circuit breaker chamber formed inside a conventional switchboard, FIG. 2 is a perspective view showing a bushing assembly of FIG. 1, FIG. 3 is a perspective view showing a structure of a conventional circuit breaker assembly, and FIG. 4 is a perspective view showing a conventional shutter assembly.

Referring to FIG. 1, a circuit breaker chamber 1a is defined in a switchboard 1. Bushing assemblies 20 and 30 are assembled to a rear face of the circuit breaker chamber 1a. The shutter assembly is positioned on front faces of the bushing assemblies 20 and 30 as shown in the figure. The front faces of the bushing assemblies 20 and 30 are covered with the shutter assembly.

Referring to FIG. 2, the bushing assemblies 20 and 30 are respectively composed of insulating material housing 21 and 31 and electrical conductors 22 and 32. There is a risk of electric shock when a user touches the electrical conductors 22 and 32 in an active state thereof. Therefore, under actual usage conditions, the electrical conductors 22 and 32 are screened with the shutter assembly to protect the user from the electrical shock.

Referring to FIG. 3, a circuit breaker assembly 10 has a main circuit 11 of the circuit breaker. The main circuit 11 of the circuit breaker has an electrical conductor 12 of the circuit breaker connected to the electrical conductors 22 and 32 of the bushing. In order for the above two electrical conductors 22 (32) and 12 to be connected to each other, the shutter assembly must operate. To this end, a shutter roller guide 13 is provided at each of both opposing sides of the circuit breaker 10 to open and close a space between the circuit breaker assembly 10 and the bushing assemblies 20 and 30.

Referring to FIG. 4, a conventional shutter assembly as described above has a structure in which upper and lower shutter plates 60 and 61 move up or down.

When the shutter roller guide 13 pushes shutter rollers 41 and 51, an upper shutter plate drive lever 40 and a lower shutter plate drive lever 50 pivots.

At the same time, an upper shutter plate drive link 42 moves upward, and a lower shutter plate drive link 52 moves downward. Accordingly, the upper shutter plate 60 moves up, and the lower shutter plate 61 moves down.

FIG. 5 is a perspective view showing a position of the circuit breaker in a test position, and FIG. 6 is a perspective view showing an operation of the shutter assembly while the circuit breaker is moving to a service position.

Referring to FIG. 5, when the circuit breaker 10 is inserted into the circuit breaker chamber 1a, the circuit breaker 10 moves to the test position. At this time, the upper shutter plate 60 and the lower shutter plate 61 cover an entirety of the front faces of the bushing assemblies 20 and 30.

As shown in FIG. 6, while the circuit breaker 10 is moving to the service position, the upper shutter lever 40 pivots in a counterclockwise direction and the lower shutter lever 50 pivots in the clockwise direction due to contact between the shutter rollers 41 and 51 and the shutter roller guide 13. Accordingly, the upper shutter plate 60 moves upward and the lower shutter plate 61 moves downward.

When the circuit breaker 10 has moved to the service position, the upper shuttle plate 60 and the lower shutter plate 61 has completed the ascending and descending motions, respectively, to fully open inlets of the bushing assemblies 20 and 30. Then, the electrical conductor 12 of the moved circuit breaker 10 is connected to the electrical conductors 22 and 32 of the bushing assembly 20 and 30.

As described above, conventionally, the upper shutter lever 40 pivots upward and the lower shutter lever 50 pivots downward due to the contact between the shutter rollers 41 and 51 and the shutter roller guide 13.

Moreover, the upper shutter plate drive link 42 moves up and the lower shutter plate drive link 52 moves down. Accordingly, the upper shutter plate 60 moves upward along a vertical direction, and the lower shutter plate 61 moves downward along the vertical direction.

However, when the circuit breaker 10 has moved to the service position, the electrical conductor 12 for the circuit breaker and the upper shutter plate 60 and the lower shutter plate 61 are close to each other. Thus, in order to avoid mechanical interference with the electrical conductor 12 of the circuit breaker, the upper shutter plate 60 and the lower shutter plate 61 must move to a level where they may deviate from openings of the bushing assemblies 20 and 30 before collision.

That is, when the circuit breaker 10 is in the service position, a sufficient distance between the conductor 12 of the circuit breaker and the upper shutter plate 60 and the lower shutter plate 61 must be maintained to maintain air insulation between the conductor 12 of the circuit breaker and the upper shutter plate 60 and the lower shutter plate 61.

In this regard, the conventional upper shutter plate 60 moves upward. Therefore, the upper shutter plate 60 moves up to a level which is away from the inlet to a position by a value greater than a predefined vertical dimension.

Therefore, the electrical conductors 22 and 32 of the bushing assemblies 20 and 30 are connected to the electrical conductor 12 of the circuit breaker. Thus, after power is connected thereto, breakdown of air electrical insulation between the conductor and a grounded upper shutter plate 60 may be prevented.

Conventionally, a movement distance of the upper shutter plate 60 should be a sufficient vertical dimension to secure an insulating distance from the plate 60 to the inlets of the bushing assemblies 20 and 30. For this reason, an overall vertical dimension of the switchboard increases, so that the miniaturization of the switchboard may not be achieved.

SUMMARY

A purpose of the present disclosure is to provide a switchboard with a pivotable shutter structure in which a shutter that opens and closes the inlet of the bushing assembly has an opening and closing mechanism operating in a pivotable scheme to reduce a vertical dimension by which the shutter moves vertically to a value smaller than a predefined value when opening the inlet, thereby reducing a size of the switchboard.

Further, another purpose of the present disclosure is to provide a switchboard with a pivotable shutter structure in which a shutter that opens and closes the inlet of the bushing assembly has an opening and closing mechanism operating in a pivotable scheme and pivots along an inner side of the switchboard when opening the inlet, thereby securing a predefined insulating distance to the bushing assembly.

Purposes of the present disclosure are not limited to the above-mentioned purpose. Other purposes and advantages of the present disclosure that are not mentioned above may be understood based on following descriptions, and will be more clearly understood with reference to embodiments of the present disclosure. Further, it will be readily apparent that the purposes and advantages of the present disclosure may be realized using means and combinations thereof indicated in the Claims.

To achieve the above objects, the present disclosure provides a switchboard having a pivotable shutter structure.

There is provided a switchboard having a pivotable shutter structure, the switchboard comprising: a switchboard body having a circuit breaker chamber defined therein into which a circuit breaker is inserted, wherein an open hole is formed in a rear face of the switchboard body, wherein a conductor of a bushing assembly is exposed through the open hole to the circuit breaker chamber; a shutter pivotably installed on the switchboard body, wherein the shutter pivots to open or close the open hole; and an actuator installed on the switchboard body and configured to actuate the shutter to pivot as the circuit breaker is inserted into the circuit breaker chamber.

In one implementation, the shutter includes: a shutter plate having a plate shape and disposed in an inner space of the switchboard body, wherein an area size of the shutter plate is equal to or larger than an area size of the open hole by a predefined value; and a pair of support members respectively extending from both opposing ends of the shutter plate and along the inner space of the switchboard body, a distal end of each of the pair of support members is hinge-connected to each of both opposing sides of the switchboard body such that the hinge corresponds to a first pivot center of the shutter plate.

In one implementation, the hinge corresponding to the first pivot center is a first hinge, wherein the first hinge includes fastening means for coupling the distal end of each of the pair of support members to each of both opposing sides of the switchboard body in a pivotal manner.

In one implementation, a first through-hole is formed in each of both opposing side walls of the body defining the circuit breaker chamber, wherein the fastening means includes a fixing member, a connection member, a nut and a washer, wherein the fixing member has one end on an outer face of each of both opposing side walls of the body defining the circuit breaker chamber and extends through the first through-hole, wherein the other end of the fixing member passing through the first through-hole is inserted into one end of the connection member, wherein the other end of the connection member passes through a second through-hole formed at one end of each of the pair of support members, wherein the other end of the connection member passing through the second through-hole is coupled to the nut, wherein the washer is interposed between the nut and the other end of the connection member.

In one implementation, the actuator includes: a pair of pivoting members disposed at a path along which the circuit breaker is inserted into the chamber, wherein as the circuit breaker is inserted into the chamber, each of the pair of pivoting members comes into contact with a shutter roller guide installed on each of both opposing sides of the circuit breaker and thus pivots upwardly around a second pivot center; and a pair of link members for hinge-connecting distal ends of the pair of pivoting members to middle portions of the pair of support members, respectively.

In one implementation, a path along which the shutter pivots extends between a position at which the shutter closes the open hole and a top position of the circuit breaker chamber.

In one implementation, when the open hole is opened, the shutter plate moves to a service position and is positioned above the circuit breaker inserted into the chamber, such that a predefined insulating distance between the shutter plate and the conductor of the bushing assembly exposed through the open hole as opened is secured.

In one implementation, each of the pair of support members includes multiple telescopic pipes connected in series to each other, wherein an elastic spring is interposed between adjacent ones of the multiple telescopic pipes, wherein rollers are installed on an inner face of a top wall of the switchboard body, wherein an installation position of the rollers is located above a main circuit such that a spacing between the installation position and the first pivot center is smaller than a pivot radius of the shutter plate around the first pivot center, wherein the shutter plate pivots so as to be positioned above the circuit breaker and at the same time, a top face of the shutter plate is pressed downwardly by the rollers, such that a length of each of the pair of support members is elastically reduced.

In one implementation, an inclined face is formed on each of both opposing tip ends of the shutter plate, wherein the inclined face guides contact of the shutter plate with the rollers.

In one implementation, the switchboard further comprises: an auxiliary shutter plate disposed on the rear face of the switchboard body, wherein the auxiliary shutter plate moves up or down along a guide shaft so as to open and close an auxiliary open hole formed under the open hole and in the rear face of the body; a pair of auxiliary pivoting members, each having one end connected to a pivot shaft of each of the pair of pivoting members so as to pivot; and a pair of auxiliary link members, each having a lower end hinge-connected to the other end of each of the pair of auxiliary pivoting members, wherein upper ends of the pair of auxiliary link members are respectively hinge-connected to both opposing ends of the auxiliary shutter plate, wherein when the pair of auxiliary pivoting members pivot downwardly, the pair of auxiliary link members move downward such that the auxiliary shutter plate moves downward to open the auxiliary open hole.

In the switchboard with the pivotable shutter structure according to the present disclosure, the shutter that opens and closes the inlet of the bushing assembly has an opening and closing mechanism operating in a pivotable scheme to reduce a vertical dimension by which the shutter moves vertically to a value smaller than a predefined value when opening the inlet, thereby reducing a size of the switchboard.

Further, in the switchboard with the pivotable shutter structure according to the present disclosure, the shutter that opens and closes the inlet of the bushing assembly has an opening and closing mechanism operating in a pivotable scheme and pivots along an inner side of the switchboard when opening the inlet, thereby securing a predefined insulating distance to the bushing assembly.

The above-described effects, and specific effects of the present disclosure as not mentioned above will be described based on specific details for carrying out the disclosure.

DETAILED DESCRIPTION

Figure 1:
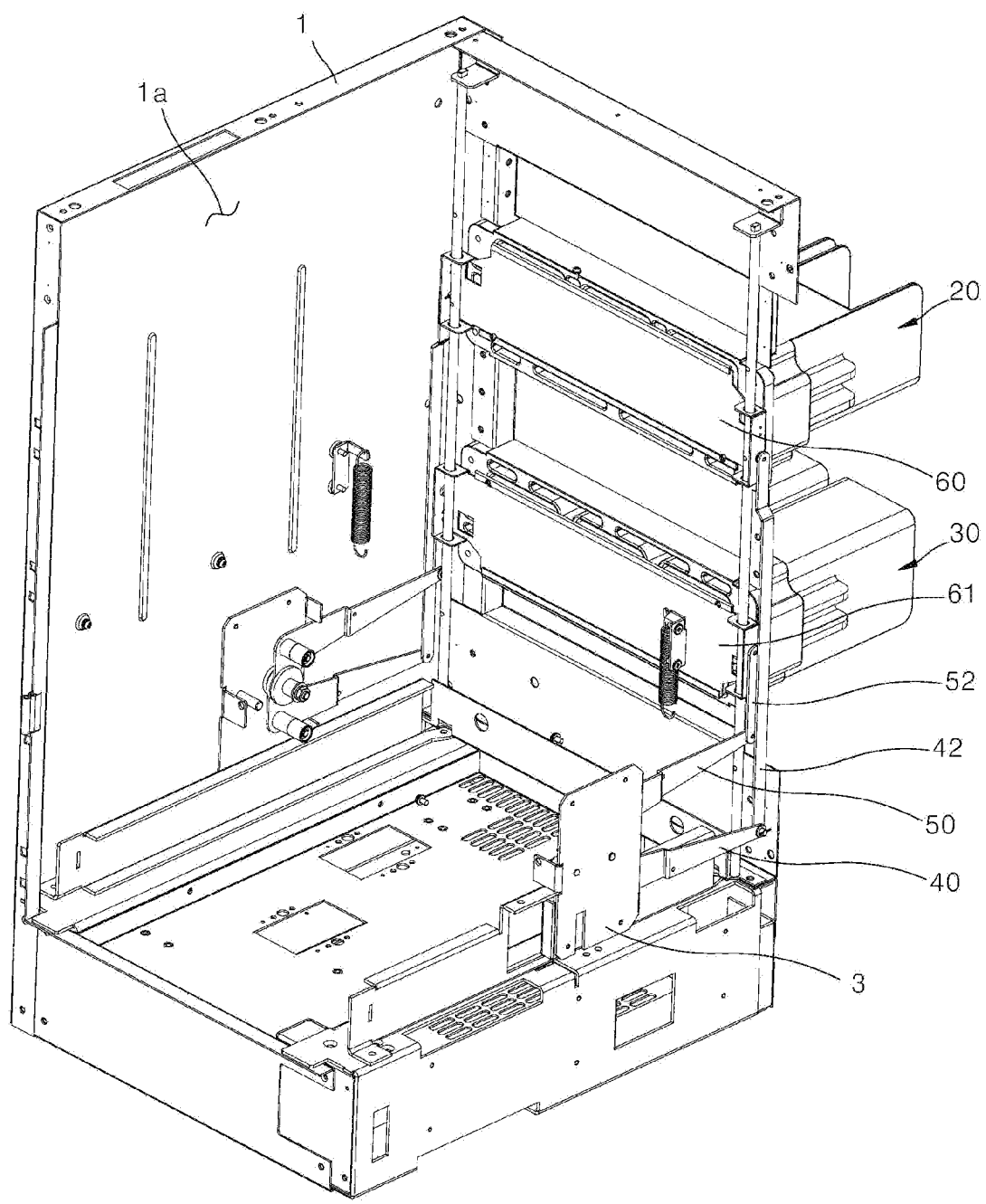
FIG. 1 is a perspective view showing a structure of a circuit breaker chamber formed inside a conventional switchboard.

The above objects, features and advantages will be described in detail later with reference to the accompanying drawings. Accordingly, a person with ordinary knowledge in the technical field to which the present disclosure belongs will be able to easily implement the technical idea of the present disclosure. In describing the present disclosure, when it is determined that a detailed description of an identified component related to the present disclosure may unnecessarily obscure the gist of the present disclosure, the detailed description is omitted. Hereinafter, a preferred embodiment according to the present disclosure will be described in detail with reference to the accompanying drawings. In the drawings, the same reference numerals are used to indicate the same or similar elements.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers.

It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Figure 7A:
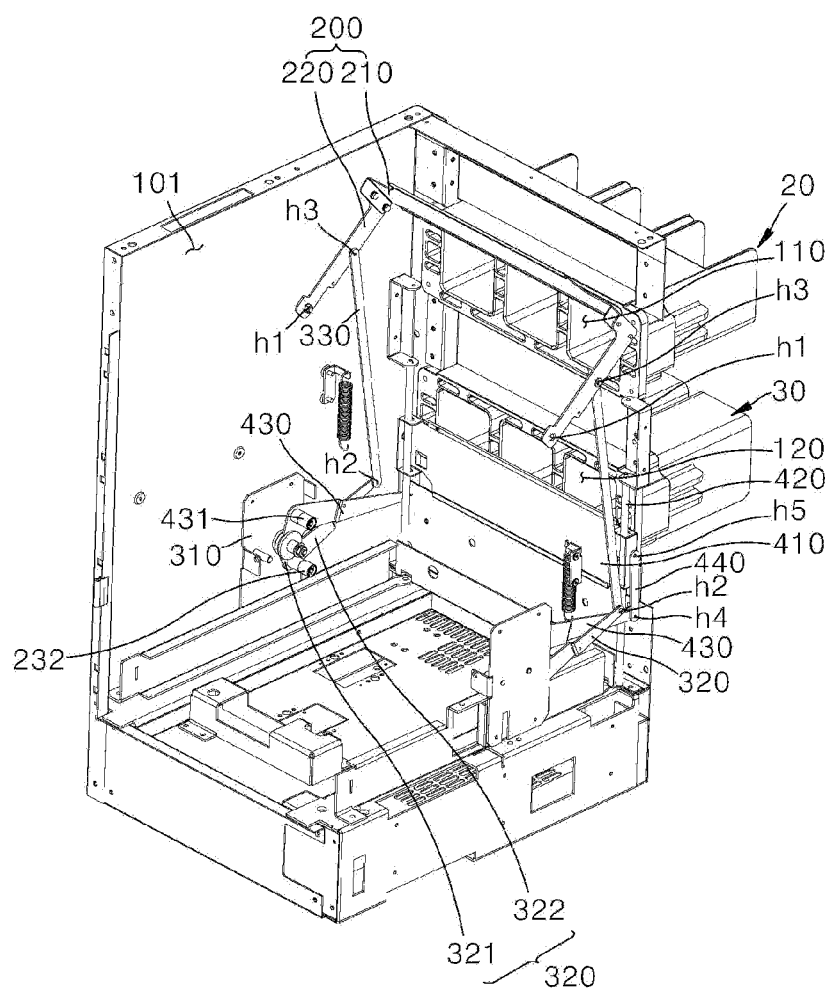
FIG. 7A is a perspective view showing a switchboard before a circuit breaker is inserted into a circuit breaker chamber.
Figure 7B:
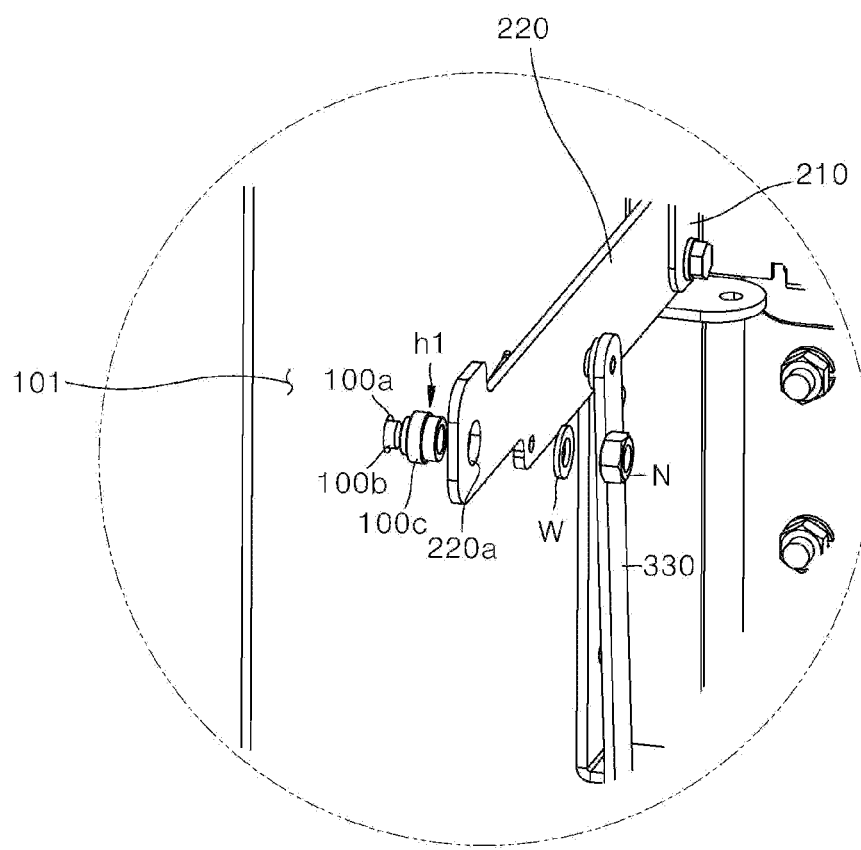
FIG. 7B is an exploded perspective view showing a first hinge structure of FIG. 7A.
Figure 8:
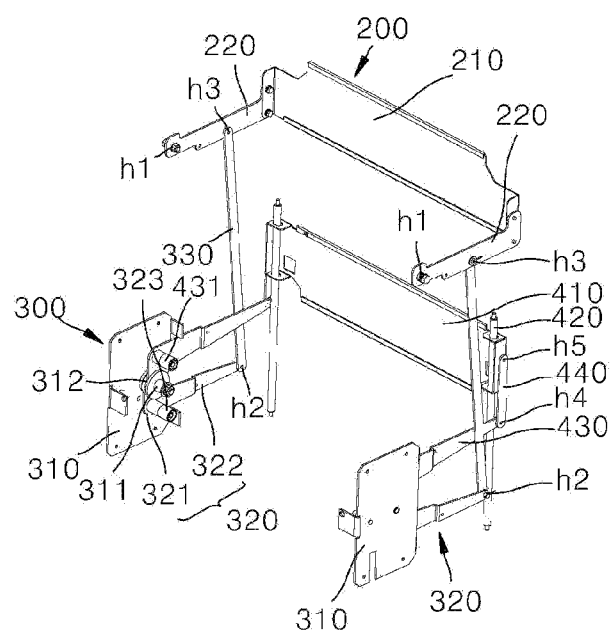
FIG. 8 is a diagram showing a pivotable shutter structure according to the present disclosure.
Figure 9:
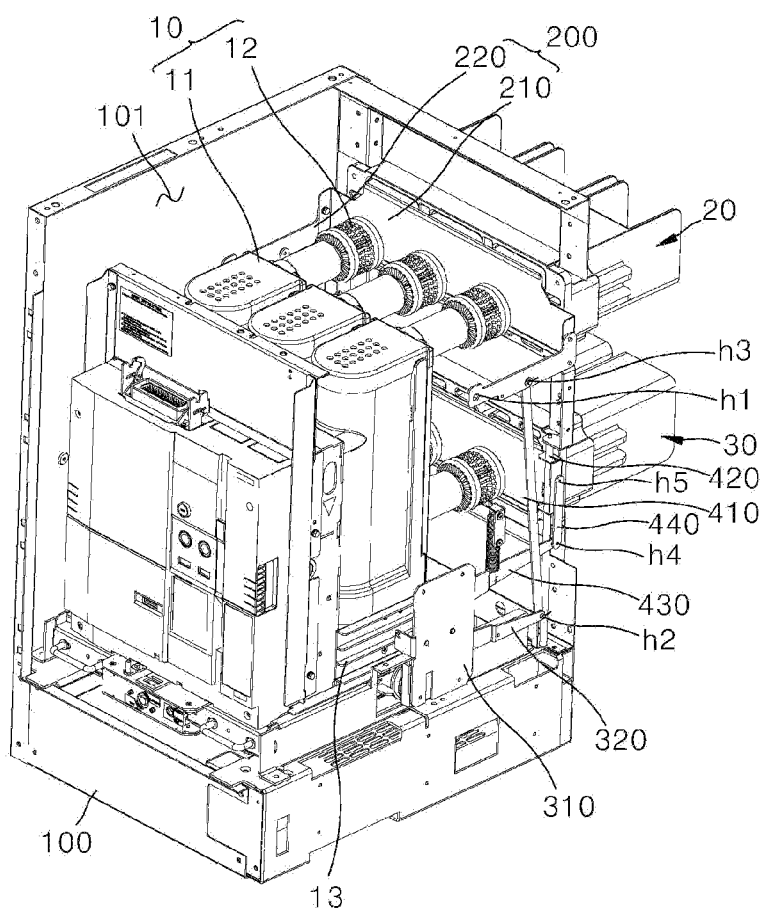
FIG. 9 is a perspective view showing a circuit breaker positioned in a test position in a circuit breaker chamber.

FIG. 7A is a perspective view showing a switchboard before a circuit breaker is inserted into a circuit breaker chamber. FIG. 7B is an exploded perspective view showing a first hinge structure of FIG. 7A. FIG. 8 is a diagram showing a pivotable shutter structure according to the present disclosure. FIG. 9 is a perspective view showing a circuit breaker positioned in a test position in a circuit breaker chamber.

Referring to FIG. 7A and FIG. 7B, the switchboard in accordance with the present disclosure includes a switchboard body 100, a shutter 200, and an actuator 300.

A circuit breaker chamber 101 is defined inside the switchboard body 100. The circuit breaker chamber 101 refers to a space into which the circuit breaker 10 is inserted.

An open hole 110 having a predefined hole area is formed in a rear face of the switchboard body 100. A bushing assembly 20 is disposed on the rear face of the switchboard body 100 in which the open hole 110 is formed.

Figure 2:
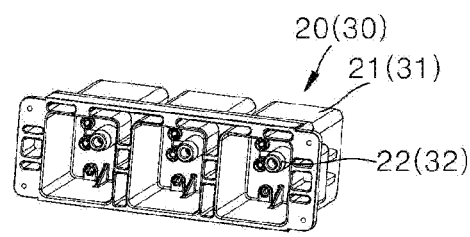
FIG. 2 is a perspective view showing a bushing assembly of FIG. 1.
Figure 3:
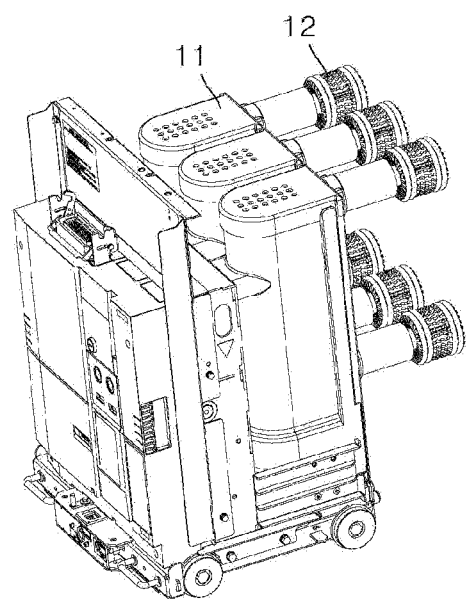
FIG. 3 is a perspective view showing a structure of a conventional circuit breaker assembly.
Figure 4:
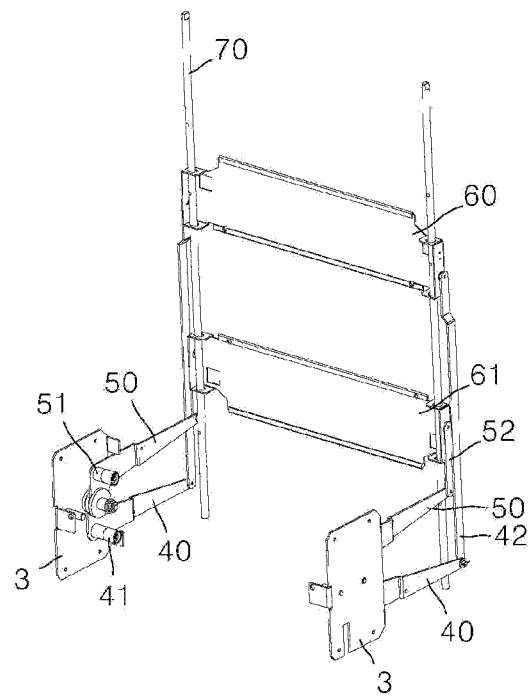
FIG. 4 is a perspective view showing a conventional shutter assembly.
Figure 5:
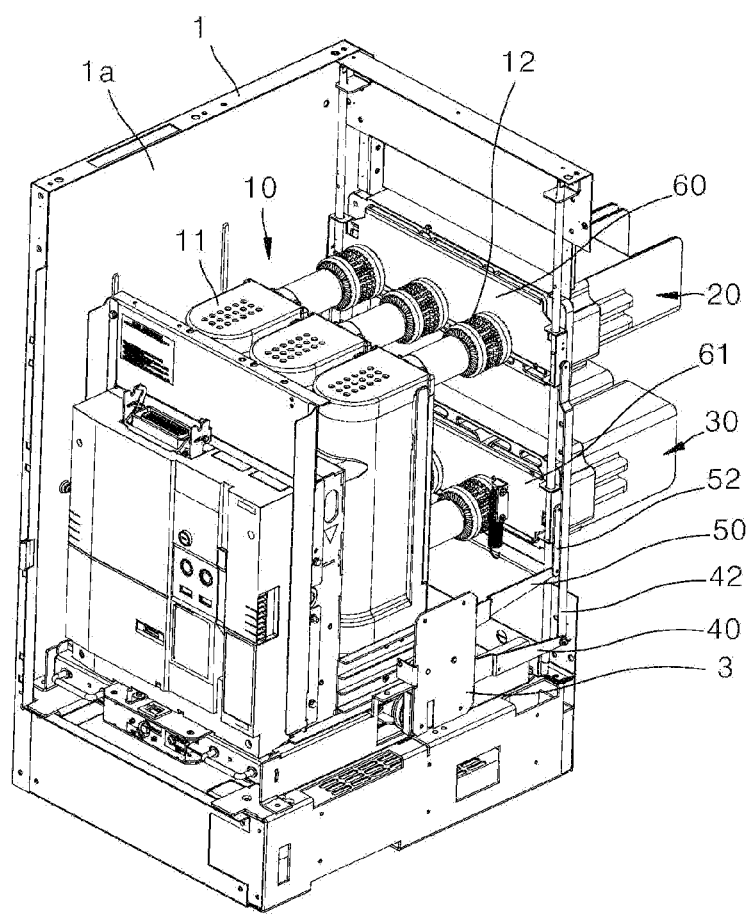
FIG. 5 is a perspective view showing a position of a circuit breaker in a test position.

The bushing assemblies 20 and 30 are respectively composed of the insulating material housings 21 and 31 and the electrical conductors 22 and 32 as described with reference to FIG. 2 above. The electrical conductors 22 and 32 of the bushing assemblies 20 and 30 are positioned to be exposed to an inner space of the switchboard body 100 through the open hole 110.

Further, the main circuit 11 of the circuit breaker has the electrical conductor 12 of the circuit breaker connected to the electrical conductors 22 and 32 of the bushing assemblies 20 and 30. Accordingly, when the circuit breaker 10 is inserted into the circuit breaker chamber 101 of the switchboard body 100 and has moved to a set service position, each of the electrical conductors 12 of the circuit breaker is electrically connected to each of the electrical conductors 22 and 23 of the bushing assemblies 20 and 30 exposed through the open hole 110.

Referring to FIG. 8, the shutter 200 according to the present disclosure is placed in an interior space of the switchboard body 100.

The shutter 200 has a shutter plate 210 and a pair of support members 220.

The shutter plate 210 is formed in a plate shape. The shutter plate 210 has an area size equal to or greater than that of the open hole 110.

The pair of support members 220 has the same shape. Each support member 220 is embodied as a plate-shaped member having a predefined length.

One end of each of the pair of support members 220 is coupled to each of both opposing ends of the shutter plate 210. One end of each of the pair of support members 220 may be integrally formed with each of both opposing ends of the shutter plate 210. Each of the pair of support members 220 is bent to form a predetermined angle with respect to the shutter plate 210. Each member 220 may be bent at a right angle, or at angle other than the right angle.

A distal end of each of the pair of support members 220 is hinge (h1)-connected to each of both opposing sides of the switchboard body 100 such that the hinge h1 acts as a first pivot center of the shutter plate 210 as shown in FIG. 7A.

Accordingly, the shutter plate 210 pivots based on a first pivot center. A pivot angle range of the shutter plate 210 may in a range of 0 degrees to a right angle. The pivot angle range of the shutter plate 210 may be in a range of 0 degrees at which the shutter plate 210 covers the open hole 110 to a right angle by which the plate 210 pivots upwardly.

Referring to FIG. 7B, the first pivot center corresponds to a first hinge.

Distal ends of the pair of support members 220 are pivotally respectively connected to both opposing sides of the switchboard body 100 via fastening means. Thus, the first hinges h1 may be formed.

The fastening means may include a following configuration.

A first through-hole 100a is formed on each of both opposing side walls of the circuit breaker chamber 101. A fixing member 100b passes from an outer wall face of the circuit breaker chamber 101 into the first through-hole 100a. One end of the fixing member 100a is fitted into one end of a connection member 100c and on an inner face of a wall defining the circuit breaker chamber 101.

The other end of the connection member 100c passes through a second through-hole 220a formed in one end of each support member 220.

The other end of the connection member 220 passing through the second through-hole 220a is coupled with a nut N. A washer W is interposed between the nut N and the other end of the connection member 100c.

In this way, the first hinge h1 may be formed between one end of each support member 220 and each of both opposing side walls defining the circuit breaker chamber 101. Referring to FIG. 8, the actuator 300 according to the present disclosure serves to drive a pivoting motion of the shutter 200 as the circuit breaker 10 is inserted into the circuit breaker chamber 101.

The actuator 300 includes a pair of fixed plates 310, a pair of pivoting members 320, and a pair of link members 330.

The pair of fixed plates 310 are respectively fixed to the inner faces of both opposing side walls of the switchboard body 100. The pair of fixed plates 310 are exposed to an inner space of the circuit breaker chamber 101. A pivot shaft 311 is formed at each of the pair of fixed plates 310.

Each of the pair of pivoting members 320 has a length. Each of the pair of pivoting members 320 is composed of a first member 321 having a first length and a second member 322 having a second length and bent at an end of the first member 321. The second length is larger than the first length. Accordingly, each of the pair of pivoting members 320 is formed in an 'L' shape. A shutter roller 323 is installed between the first and second members 321 and 322. The shutter roller 323 pivots the pivoting member 320 counterclockwise while being in contact with the shutter roller guide 13 formed on each of both opposing sides of the circuit breaker 10 inserted into the circuit breaker chamber 101.

Each of the pair of pivoting members 320 is disposed below the pivot shaft 311 of each fixed plate 310. An end of the first member 321 of each of the pair of pivoting members 320 is pivotally connected to the pivot shaft 311.

Moreover, a torsion spring 312 is installed around the pivot shaft 311 so that after each pivoting member 320 pivots, each member 320 is returned to its original position under an elastic force of the spring 312.

In one example, a lower end of each of the pair of link members 330 is hinge (h2)-connected to the other end of each of the pair of pivoting members 320. That is, the lower end of each of the pair of link members 330 is hinge (h2)-connected to an end of the second member 322 of each of the pair of pivoting members 320.

Moreover, an upper end of each of the pair of link members 330 is hinge (h3)-connected to a middle portion of the pair of support members 220.

Accordingly, the pair of link members 330 respectively links the pair of pivoting members 320 and the pair of support members 220 to each other so as to transmit a pivoting force from the pivoting members 320 to the pair of support members 220.

Each of the pair of link members 330 has a length larger than that of each of the support member 220 and the pivoting member 320 by a predetermined value.

In this regard, a pivot path of the shutter plate 210 extends between a position for closing the open hole 110 and a top position of the circuit breaker chamber 101.

Further, when the open hole 110 is opened, the shutter plate 210 is positioned above the circuit breaker 10 which has moved to the service position and is inserted into the room. Thus, an insulating distance set in a predefined position inside the circuit breaker chamber 101 so as not to be limited to the vertical direction may be formed between the shutter plate 210 and the bushing conductor 22 of the bushing assembly 20 exposed through the open hole 110 as opened.

In one example, in accordance with the present disclosure, an auxiliary open hole 120 is formed under the open hole 110 and in the rear face of the switchboard body 100. The auxiliary open hole 120 may have the same shape as that of the open hole 110.

An auxiliary shutter plate 410 for opening and closing the auxiliary open hole 120 is disposed on the rear face of the switchboard body 100.

A pair of guide shafts 420 having a predefined vertical length are respectively installed at both opposing sides of the auxiliary shutter plate 410, and on the rear face of the switchboard body 100.

The pair of guide shafts 420 respectively pass through both opposing ends of the auxiliary shutter plate 410.

Accordingly, the auxiliary shutter plate 410 moves vertically along the pair of guide shafts 420.

Moreover, a pair of auxiliary pivoting members 430 are disposed at upper portions of the pivot shafts 311 of the pair of fixed plates 310 as described above. The auxiliary pivoting member 430 is formed in the same shape as that of the above-described pivoting member 320.

One end of each of the pair of auxiliary pivoting members 430 is pivotally connected to the pivot shaft 311 and pivots vertically.

In this regard, the pair of auxiliary pivoting members 430 are respectively disposed above the pair of the above-mentioned pivoting members 320. The pair of auxiliary pivoting members 430 are positioned vertically symmetrically with respect to the pair of the above-mentioned pivoting members 320, respectively.

Figure 6:
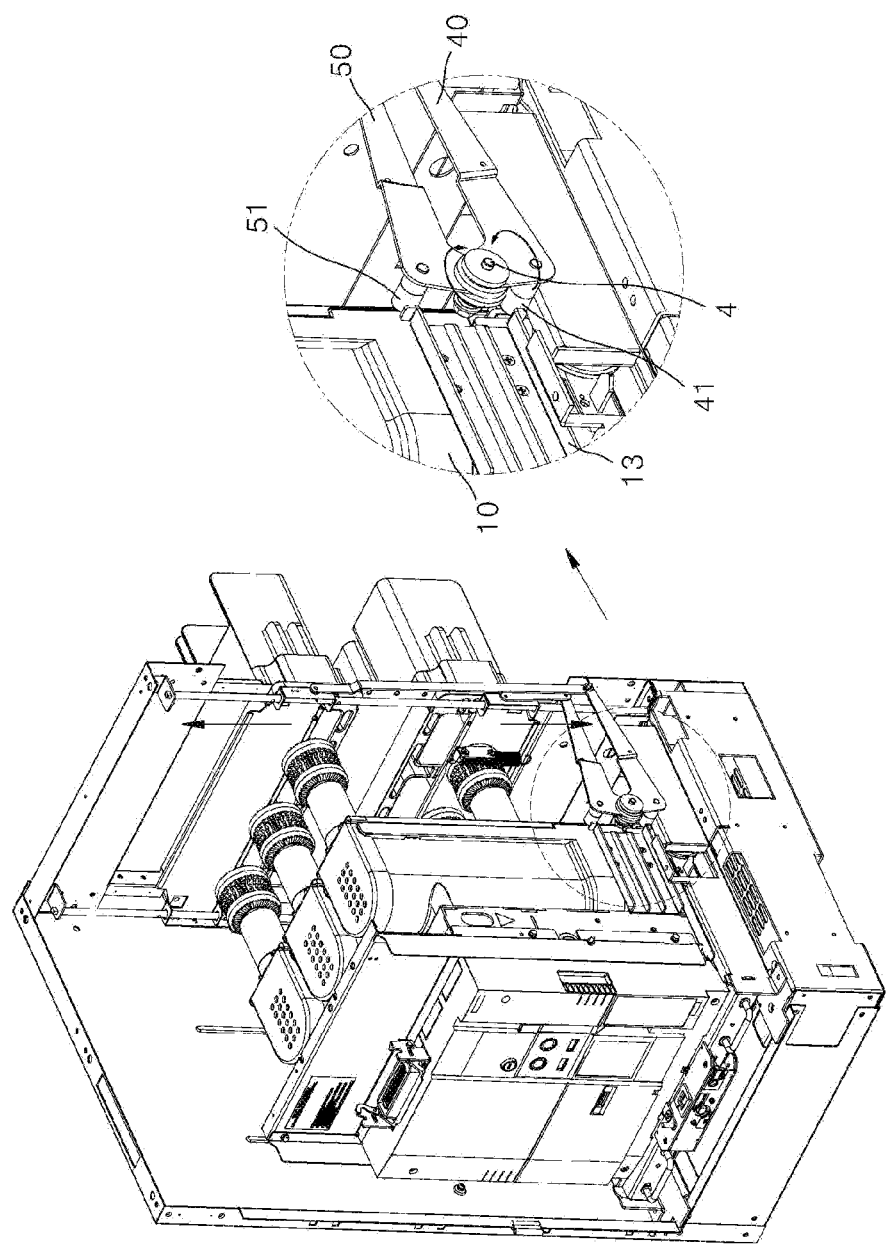
FIG. 6 is a perspective view showing an operation of a shutter assembly while a circuit breaker is moving to a service position.

A shutter roller 431 of a structure similar to that of the shutter roller 323 as described above is installed at each of the pair of auxiliary pivoting members 430. The shutter roller 431 pivots the auxiliary pivoting member 430 while being in contact with the shutter roller guide (13 in FIG. 6) formed on each of both opposing sides of the circuit breaker 10 inserted into the circuit breaker chamber 101.

The other end of each of the pair of auxiliary pivoting members 430 is hinge (h4)-connected to a lower end of each of the pair of auxiliary link members 440. An upper end of each of the pair of auxiliary link members 440 is hinge (h5)-connected to each of both opposing ends of the auxiliary shutter plate 410.

Accordingly, when the pair of auxiliary pivoting members 430 pivot downwards, the pair of auxiliary link members 440 move downward, and thus the auxiliary shutter plate 410 moves downward to open the auxiliary open hole 120.

Figure 10:
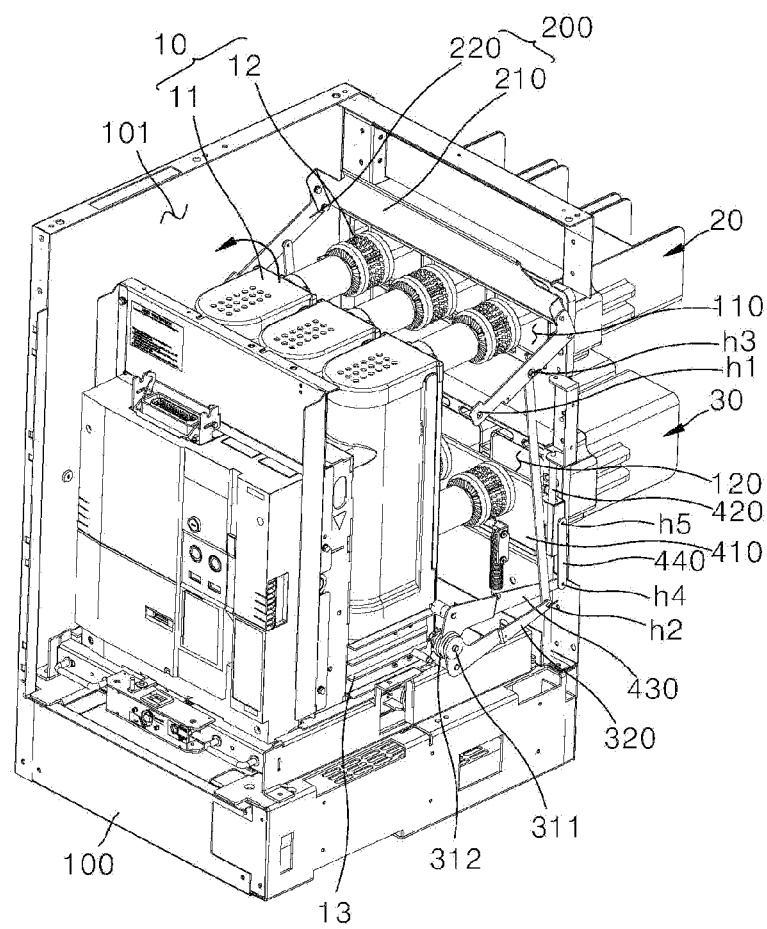
FIG. 10 is a perspective view showing a state in which a circuit breaker is inserted into a circuit breaker chamber.
Figure 11:
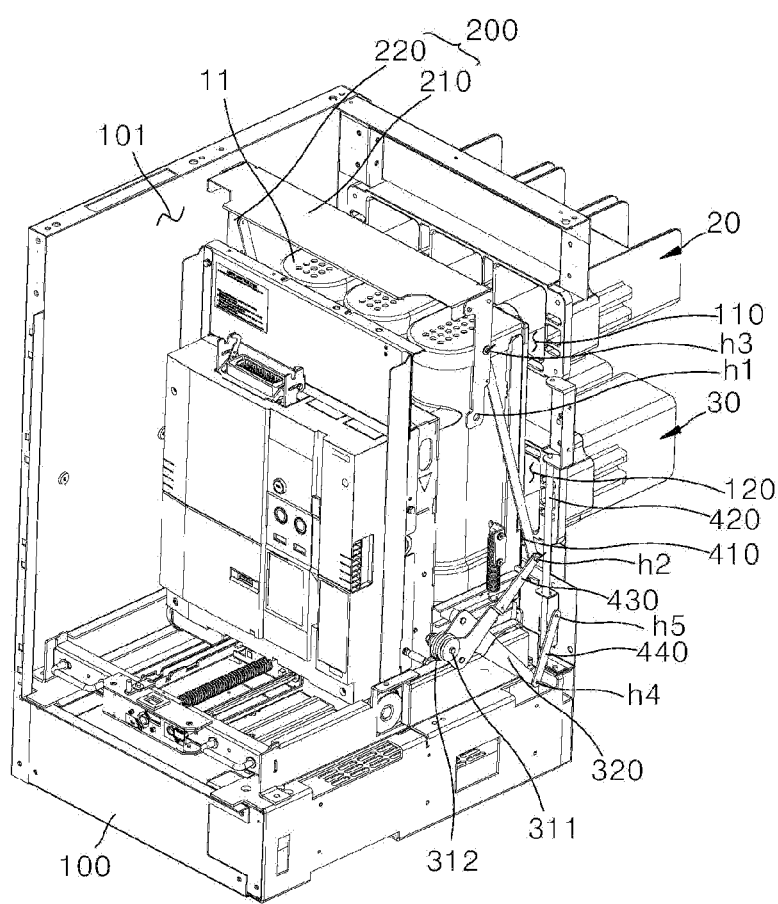
FIG. 11 is a perspective view showing a state in which a circuit breaker is inserted into a service position.
Figure 12:
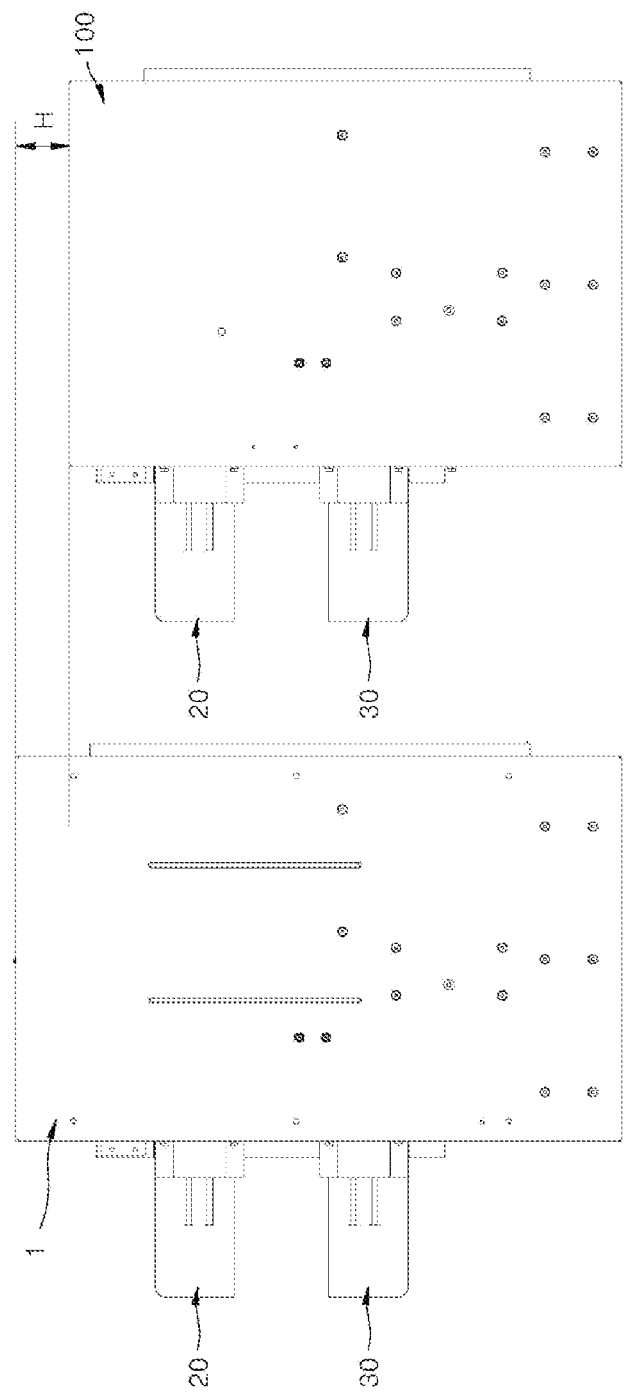
FIG. 12 is a side view showing a difference between a vertical dimension of the switchboard according to the present disclosure and a vertical dimension of the conventional switchboard.

FIG. 9 is a perspective view showing a circuit breaker positioned in a test position in a circuit breaker chamber. FIG. 10 is a perspective view showing a state in which a circuit breaker is inserted into a circuit breaker chamber. FIG. 11 is a perspective view showing a state in which a circuit breaker is inserted into a service position. FIG. 12 is a side view showing a difference between a vertical dimension of the switchboard according to the present disclosure and a vertical dimension of the conventional switchboard.

Referring to FIG. 9 to FIG. 11, a process in which the shutter 200 operates under an operation of the actuator 300 as the circuit breaker 10 is inserted into circuit breaker chamber 101 is described.

As shown in FIG. 9, the shutter plate 210 covers and closes the open hole 110 while the circuit breaker 10 is positioned at the test position in the circuit breaker chamber 101. The shutter plate 210 is in an initial state before pivoting upwardly. At this time, the bushing assembly 20 is positioned in rear of the open hole 110, and the conductor 22 of the bushing assembly 20 is positioned near the open hole 110.

At the same time, the auxiliary shutter plate 410 covers and closes the auxiliary open hole 120. The auxiliary shutter plate 410 is in an initial state before moving downward. In this regard, the auxiliary bushing assembly 30 is positioned in rear of the auxiliary open hole 120, and the auxiliary conductor 32 of the auxiliary bushing assembly 30 is positioned near the auxiliary open hole 120.

At this time, a vertical spacing between each of the pair of pivoting members 320 and each of the pair of auxiliary pivoting members 430 is in an increased state.

In this state, as shown in FIG. 10, the circuit breaker 10 may move to the service position within circuit breaker chamber 101.

At this time, the respective shutter roller guides 13 installed on respective both opposing sides of the circuit breaker 10 may contact and push the shutter rollers 323 and 431 of the pivoting member 320 and the auxiliary pivoting member 430, respectively.

Then, the pair of pivoting members 320 and the pair of auxiliary pivoting members 430 may pivot such that the vertical spacing between each of the pair of pivoting members 320 and each of the pair of auxiliary pivoting members 430 is reduced. That is, each of the pair of pivoting members 320 pivots in the upward or counterclockwise direction, while each of the pair of auxiliary pivoting members 430 pivots downwardly or in the clockwise direction.

Then, each of the pair of link members 330 hinge-connected to the other end of each of the pair of pivoting members 320 begins to move upward. At the same time, the pair of support members 220 hinge (h3)-connected to the tops of the pair of link members 330 start to pivot in the counterclockwise direction around the hinge h1 as the first pivot center.

Accordingly, the shutter plate 210 having both opposing ends respectively hinge-connected to the other ends of the pair of support members 220 pivots upwardly and along the counterclockwise direction around the first pivot center to gradually open the open hole 110.

At the same time, the pair of auxiliary link members 440 respectively hinge-connected to the other ends of the pair of auxiliary pivoting members 430 pivoting downwardly and along the clockwise direction start to move downward. At the same time, the auxiliary shutter plate 410 having both opposing ends respectively hinge-connected to the tops of the pair of auxiliary link members 440 may gradually move down.

Accordingly, the auxiliary shutter plate 410 begins to gradually open the auxiliary open hole 120 while the plate 410 is gradually descending.

Referring to FIG. 11, when the circuit breaker 10 moves to the service position in the circuit breaker chamber 101, the shutter plate 210 pivots so as to be positioned on top of the main circuit 11 to open the open hole 110 and, at the same time, the auxiliary shutter plate 410 moves down to open an entirety of the auxiliary open hole 120.

Accordingly, the electrical conductors 12 of the circuit breaker of the main circuits 11 which have moved to the service position may be electrically connected to the electrical conductors 22 of the bushing assembly 20 and the electrical conductors 32 of the auxiliary bushing assembly 30, respectively.

Referring to FIG. 12, in accordance with the present disclosure, the open hole 110 positioned above the auxiliary open hole 120 is opened while the shutter plate 210 pivots upwardly.

In a state in which the open hole 110 is fully opened, the shutter plate 210 pivots upwardly from the open hole 110 in a counterclockwise direction and then is positioned the main circuits 11 and extends horizontally.

Accordingly, a vertical dimension of the switchboard body 100 may be reduced by a predefined vertical dimension value, compared to the conventional switchboard body 100 in the prior art in which the shutter plate opens and closes the open hole 110 while the shutter plate moves up and down. That is, the vertical dimension of the switchboard body 100 according to the present disclosure may be reduced by a predefined vertical dimension H, compared to the vertical dimension of the conventional switchboard 1. Thus, the switchboard may be easily miniaturized.

Figure 13:
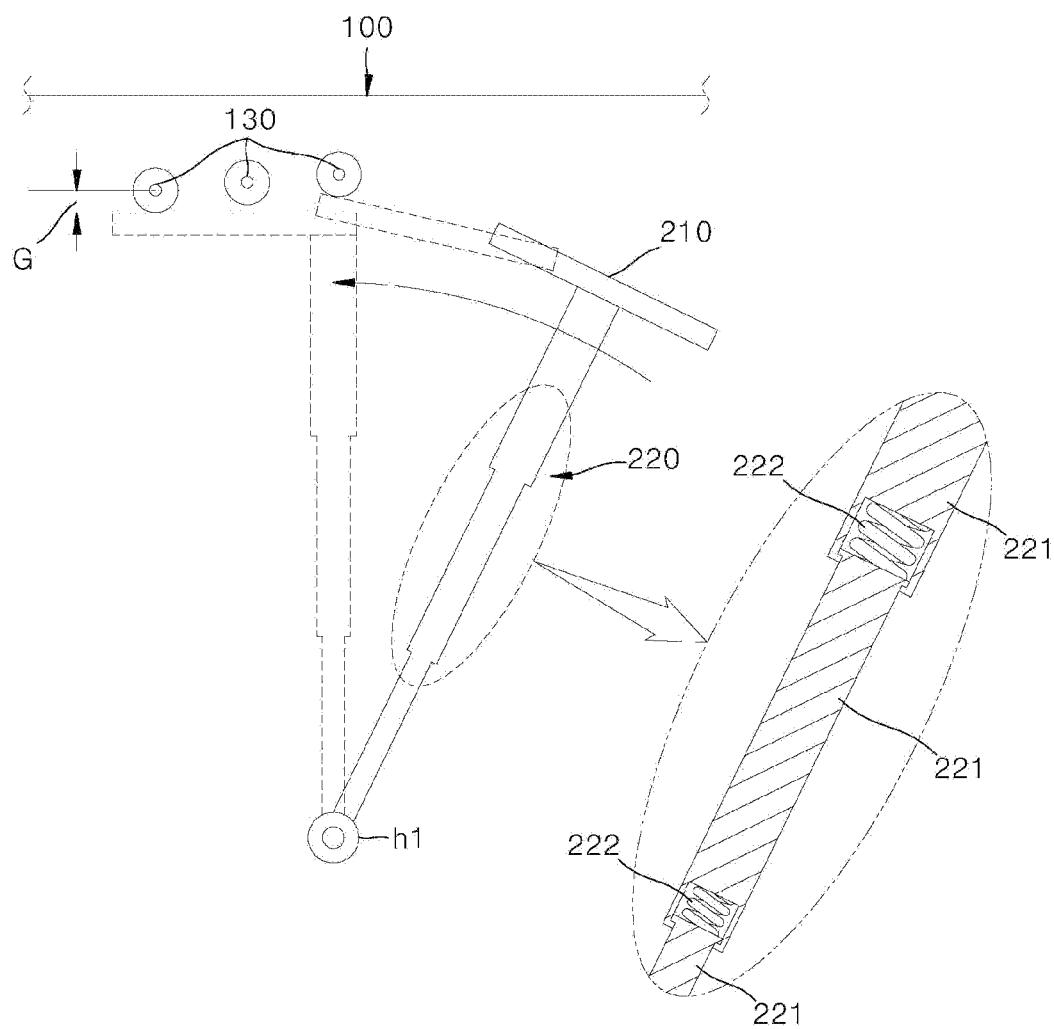
FIG. 13 is a diagram showing an example of a structure that guides a shutter plate according to the present disclosure to be positioned at a level which is lowered by a predefined value while pivoting so as to be positioned above a main circuit.

FIG. 13 is a diagram showing an example of a structure that guides a shutter plate according to the present disclosure to be positioned at a level which is lowered by a predefined value while pivoting so as to be positioned above a main circuit.

Referring to FIG. 13, each of the pair of support members 220 according to the present disclosure may include bar members 221 constituting multi-stages and connected to each other while an elastic spring 222 is interposed therebetween.

Rollers 130 are installed on an inner face of each of bottom opposing side walls of the switchboard body 100.

The rollers 130 are located above the main circuit 11. A distance between the first pivot center and the rollers 130 may be smaller than a pivoting radius of the shutter plate 210 around the first pivot center.

As the shutter plate 210 pivots so as to be positioned above the circuit breaker 10, a top face of the shutter plate 210 comes into contact with the rollers 130 in a rolling manner and moves along the rollers and is pressed downwardly such that a length of each of the pair of support members 220 may be elastically reduced.

According to the above configuration, when the shutter plate 210 pivots to be positioned on top of the main circuit 11, a vertical position of the shutter plate is lowered compared to a case in which the support member 220 is not configured in the manner as shown in FIG. 13. Thus, the vertical dimension of the switchboard body 100 may be reduced more efficiently.

Figure 14:
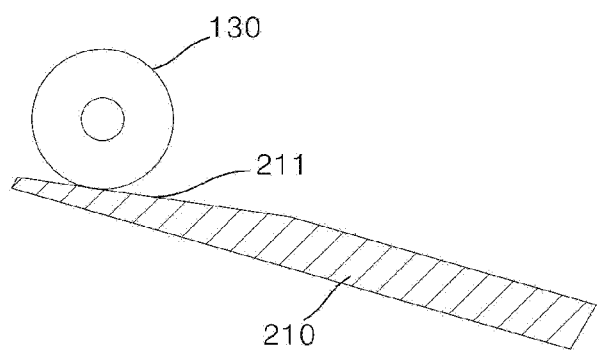
FIG. 14 is a diagram showing an example in which an inclined face is formed at a tip portion of a shutter plate of FIG. 13.

FIG. 14 is a diagram showing an example in which an inclined face is formed at a tip portion of the shutter plate of FIG. 13.

Referring to FIG. 14, an inclined face 211 guiding contact of the shutter plate with the rollers 130 is formed at each of both opposing ends of the shutter plate 210.

The inclined face 211 serves to guide the shutter plate 210 so that the shutter plate pivots in the counterclockwise direction from an initial position while a top face thereof is easily pressed by the rollers 130.

In the switchboard with the pivotable shutter structure according to the present disclosure, the shutter that opens and closes the inlet of the bushing assembly has an opening and closing mechanism operating in a pivotable scheme to reduce a vertical dimension by which the shutter moves vertically to a value smaller than a predefined value when opening the inlet, thereby reducing a size of the switchboard.

Further, in the switchboard with the pivotable shutter structure according to the present disclosure, the shutter that opens and closes the inlet of the bushing assembly has an opening and closing mechanism operating in a pivotable scheme and pivots along an inner side of the switchboard when opening the inlet, thereby securing a predefined insulating distance to the bushing assembly.

The present disclosure as described above may be subjected to various substitutions, modifications and changes within the scope that does not depart from the technical spirit of the present disclosure by those of ordinary skill in the technical field to which the present disclosure belongs. Thus, the present disclosure is not limited to the above-described embodiments and the attached drawings.

What is claimed is:

1. A switchboard having a pivotable shutter structure, the switchboard comprising:
    a switchboard body having:
        a circuit breaker chamber defined therein into which a circuit breaker is inserted,
        an open hole formed in a rear face of the switchboard body,
        wherein a conductor of a bushing assembly is exposed through the open hole to the circuit breaker chamber, and
        a pressing means is installed on an inner face of a top wall of the switchboard body, wherein an installation position of the pressing means is located above a main circuit of the circuit breaker;
    a shutter pivotably installed on the switchboard body, wherein the shutter pivots to open or close the open hole, the shutter includes:
        a shutter plate having a plate shape and disposed in an inner space of the switchboard body, wherein an area size of the shutter plate is equal to or larger than an area size of the open hole; and
        a pair of support members respectively extending from both opposing ends of the shutter plate and along the inner space of the switchboard body, wherein each of the pair of support members includes multiple telescopic pipes connected in series to each other, wherein an elastic spring is interposed between adjacent ones of the multiple telescopic pipes;
        wherein a distal end of each of the pair of support members is hinge-connected to a corresponding one of both opposing sides of the switchboard body by a hinge defining a first pivot center of the shutter, a spacing between the installation position of the pressing means and the first pivot center is smaller than a pivot radius of the shutter plate around the first pivot center, and the shutter plate pivots so as to be positioned above the circuit breaker and at the same time, a top face of the shutter plate is pressed downwardly by the pressing means, such that a length of each of the pair of support members is elastically reduced; and
    an actuator installed on the switchboard body and configured to actuate the shutter to pivot as the circuit breaker is inserted into the circuit breaker chamber.

2. The switchboard of claim 1, wherein the hinge corresponding to the first pivot center is a first hinge,
    wherein the first hinge includes fastening means for coupling the distal end of each of the pair of support members to the corresponding one of the both opposing sides of the switchboard body in a pivotal manner.

3. The switchboard of claim 2, wherein a first through-hole is formed in a corresponding one of the both opposing sidewalls of the switchboard body defining the circuit breaker chamber,
    wherein the fastening means includes a fixing member, a connection member, a nut, and a washer,
    wherein the fixing member has one end on an outer face of the corresponding one of the both opposing sidewalls of the switchboard body defining the circuit breaker chamber and extends through the first through-hole,
    wherein another end of the fixing member passing through the first through-hole is inserted into one end of the connection member,
    wherein another end of the connection member passes through a second through-hole formed at one end of each of the pair of support members,
    wherein the another end of the connection member passing through the second through-hole is coupled to the nut, and
    wherein the washer is interposed between the nut and the another end of the connection member.

4. The switchboard of claim 1, wherein the actuator includes:
    a pair of pivoting members disposed at a path along which the circuit breaker is inserted into the circuit breaker chamber, wherein as the circuit breaker is inserted into the circuit breaker chamber, each of the pair of pivoting members comes into contact with a shutter roller guide installed on each of both opposing sides of the circuit breaker and thus the pair of pivoting members pivots upwardly around a second pivot center; and a pair of link members for hinge-connecting distal ends of the pair of pivoting members to middle portions of the pair of support members, respectively.

5. The switchboard of claim 4, wherein each of the pair of pivoting members includes a first member having a first length, and a second member bent at an end of the first member and having a second length, wherein the second length is larger than the first length.

6. The switchboard of claim 1, wherein a path along which the shutter pivots extends between a position at which the shutter closes the open hole and a top position of the circuit breaker chamber.

7. The switchboard of claim 6, wherein when the open hole is opened, the shutter plate moves to a service position and is positioned above the circuit breaker inserted into the circuit breaker chamber, such that a predefined insulating distance between the shutter plate and the conductor of the bushing assembly exposed through the open hole as opened is secured.

8. The switchboard of claim 1, wherein an inclined face is formed on each of both opposing tip ends of the shutter plate, wherein the inclined face guides contact of the shutter plate with the rollers.

9. The switchboard of claim 1, wherein the switchboard further comprises:

an auxiliary shutter plate disposed on the rear face of the switchboard body, wherein the auxiliary shutter plate moves up or down along a guide shaft so as to open and close an auxiliary open hole formed under the open hole and in the rear face of the switchboard body;

a pair of auxiliary pivoting members, each having one end connected to a pivot shaft of each of the pair of pivoting members so as to pivot; and a pair of auxiliary link members, each having a lower end hinge-connected to another end of each of the pair of auxiliary pivoting members, wherein upper ends of the pair of auxiliary link members are respectively hinge-connected to both opposing ends of the auxiliary shutter plate, and wherein when the pair of auxiliary pivoting members pivot downwardly, the pair of auxiliary link members move downward such that the auxiliary shutter plate moves downward to open the auxiliary open hole.

10. The switchboard of claim 1, wherein the pressing means is a plurality of rollers.

* * * * *